(12) United States Patent
Regale et al.

(10) Patent No.: US 7,881,314 B2
(45) Date of Patent: Feb. 1, 2011

(54) NETWORK DEVICE PROVIDING ACCESS TO BOTH LAYER 2 AND LAYER 3 SERVICES ON A SINGLE PHYSICAL INTERFACE

(75) Inventors: Chiara Regale, Palo Alto, CA (US); Ali Sajassi, San Ramon, CA (US); Vijay Nain, Sunnyvale, CA (US); Shobana Biederman, San Jose, CA (US); Robert G. Pothier, Tewksbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 965 days.

(21) Appl. No.: 11/415,008

(22) Filed: May 1, 2006

(65) Prior Publication Data

US 2007/0253432 A1    Nov. 1, 2007

(51) Int. Cl.
*H04L 12/28* (2006.01)
(52) U.S. Cl. .................................. 370/401; 370/409
(58) Field of Classification Search ................... None
See application file for complete search history.

(56) References Cited

U.S. PATENT DOCUMENTS

| | | | |
|---|---|---|---|
| 7,072,346 B2 * | 7/2006 | Hama .................. | 370/395.53 |
| 7,095,760 B1 * | 8/2006 | Parruck et al. ............. | 370/539 |
| 7,130,307 B2 * | 10/2006 | Nakamura et al. ........ | 370/395.5 |
| 7,203,762 B2 * | 4/2007 | Yamada et al. ............. | 709/238 |
| 7,386,010 B2 * | 6/2008 | Solomon et al. ............ | 370/466 |
| 7,433,359 B2 * | 10/2008 | Havala et al. ............ | 370/395.5 |
| 2004/0037275 A1 * | 2/2004 | Li et al. ....................... | 370/370 |
| 2004/0117438 A1 * | 6/2004 | Considine et al. ........... | 709/203 |
| 2004/0133634 A1 * | 7/2004 | Luke et al. ................... | 709/203 |
| 2004/0223497 A1 * | 11/2004 | Sanderson et al. ..... | 370/395.52 |
| 2005/0063399 A1 * | 3/2005 | Zaitsu ........................ | 370/401 |
| 2005/0111445 A1 * | 5/2005 | Wybenga et al. ............ | 370/389 |
| 2005/0201387 A1 * | 9/2005 | Willis ..................... | 370/395.52 |
| 2005/0243818 A1 * | 11/2005 | Foglar et al. ................ | 370/389 |
| 2006/0050719 A1 * | 3/2006 | Barr et al. ................... | 370/401 |
| 2006/0221960 A1 * | 10/2006 | Borgione .................... | 370/390 |
| 2007/0058638 A1 * | 3/2007 | Guichard et al. ....... | 370/395.31 |
| 2007/0140250 A1 * | 6/2007 | McAllister et al. .......... | 370/392 |

* cited by examiner

*Primary Examiner*—Pankaj Kumar
*Assistant Examiner*—Eunsook Choi
(74) *Attorney, Agent, or Firm*—The Law Office of Bradley J. Bereznak

(57) ABSTRACT

A network node includes a first port and a second port, the second port being operable to carry a first type of data traffic over a main physical interface, the first type of data traffic including Layer 2 services. The second port is operable to simultaneously carry a second type of data traffic over a sub-interface of the main physical interface. The second type of data traffic consisting of Layer 3 services that include point-to-point (P2P), point-to-multipoint (P2MP), and multipoint services.

10 Claims, 3 Drawing Sheets

```
            interface 1/1
         ┌  switchport
    L2  ─┤  switchport mode trunk
         └  switchport trunk vlan 10-100
         ┌  interface 1/1.300
    L3  ─┤  xconnect EoMPLS VC x to peer abcd
         └  interface 1/1.400
```

FIG. 4

NETWORK DEVICE PROVIDING ACCESS TO BOTH LAYER 2 AND LAYER 3 SERVICES ON A SINGLE PHYSICAL INTERFACE

FIELD OF THE INVENTION

The present invention relates generally to digital computer network technology; more particularly, to methods and apparatus for providing Local Area Network (LAN) and Wide Area Network (WAN) services over Internet protocol (IP) networks.

BACKGROUND OF THE INVENTION

A LAN is a high-speed network (typically 10 to 1000 Mbps) that supports many computers connected over a limited distance (e.g., under a few hundred meters). Typically, a LAN spans a single building. U.S. Pat. No. 6,757,286 provides a general description of a LAN segment. A WAN, in contrast, is a data communications network that spans any distance and is usually provided by a public carrier (such as a telephone company or service provider). A Virtual Local Area Network (VLAN) is mechanism by which a group of devices on one or more LANs that are configured using management software so that they can communicate as if they were attached to the same LAN, when in fact they are located on a number of different LAN segments. VLANs are basically broadcast domains defined within switches to allow control of broadcast, multicast, unicast, and unknown unicast within a Layer 2 device. After a VLAN has been created, individual switch ports (also referred to as "access ports") are assigned to the VLAN. These access ports provide a connection for end-users or node devices, such as a router or server. Note, however, that VLAN information is not normally passed between switches; that is, trunk lines are required to pass VLAN information between switches. Because VLANs are based on logical instead of physical connections, they are extremely flexible.

Virtual Private Network (VPN) services provide secure network connections between different locations. A company, for example, can use a VPN to provide secure connections between geographically dispersed sites that need to access the corporate network. An IP VPN is the foundation many companies use for deploying or administering value-added services including applications and data hosting network commerce, and telephony services to business customers. An example of an IP-based Virtual Private Network is disclosed in U.S. Pat. No. 6,693,878.

There are three types of VPN classified by the network layer used to establish the connection between the customer and provider network: Layer 1, VPNs, which are simple point-to-point connections using Layer 1 circuits such as SONET; Layer 2 VPNs (L2VPNs), where the provider delivers Layer 2 (L2) circuits to the customer (one for each site) and provides switching of the customer data; and Layer 3 (L3) VPNs (L3VPNs), where the PE device participates in the customer's routing by managing the VPN-specific routing tables, as well as distributing routes to remote sites. In a Layer 3 IP VPN, customer sites are connected via IP routers, e.g., provider edge (PE) and intermediate provider (P) nodes, that can communicate privately over a shared backbone as if they are using their own private network.

Each VPN is commonly associated with one or more VPN routing/forwarding instances (VRFs). A VRF defines the VPN membership of a customer site attached to a provider edge (PE) router. A VRF usually consists of an IP routing table, a derived forwarding table, a set of interfaces that use the forwarding table, and a set of rules and routing protocol parameters that control the information that is included into the routing table. Packet forwarding information is stored in the IP routing table and the forwarding table for each VRF. A VRF is only one type of VPN.

Multi-protocol label switching (MPLS) Border Gateway Protocol (BGP) networks are one type of L3VPN solution. MPLS-based VPNs use a Layer 3 connectionless architecture and a peer model that requires a customer site to only peer with one PE router as opposed to all other customer premises equipment (CPE) or customer edge (CE) routers that are members of the VPN. The connectionless architecture allows the creation of VPNs in Layer 3, eliminating the need for tunnels or virtual circuits (VCs). U.S. Pat. No. 6,665,273 describes a MPLS system within a network device for traffic engineering.

Virtual Private LAN Service (VPLS) has recently emerged as a L2VPN to meet the need to connect geographically dispersed locations with a protocol-transparent, any-to-any, full-mesh service. VPLS is an architecture that delivers Layer 2 service that in all respects emulates an Ethernet LAN across a wide area network (WAN) and inherits the scaling characteristics of a LAN. All customer sites in a VPLS appear to be on the same LAN, regardless of their locations. In other words, with VPLS, customers can communicate as if they were connected via a private Ethernet LAN segment. The basic idea behind VPLS is to set up a full-mesh of label switched paths (LSPs) between each PE router so that Media Access Control (MAC) frames received on the customer side can be switched based on their MAC addresses and then encapsulated into MPLS/IP packets on the P node side and sent across the VPLS domain over the full mesh. Conceptually, VPLS can therefore be thought of as an emulated Ethernet LAN segment connected by a set of virtual bridges or virtual Ethernet switches.

Digital Subscriber Line (DSL) technology is widely-used today for increasing the bandwidth of digital data transmissions over the existing telephone network infrastructure. In a typical system configuration, a plurality of DSL subscribers are connected to a service provider (SP) network through a Digital Subscriber Line Access Multiplexer (DSLAM), which concentrates and multiplexes signals at the telephone service provider location to the broader wide area network. Basically, a DSLAM takes connections from many customers or subscribers and aggregates them onto a single, high-capacity connection. The DSLAM may also provide additional functions such as routing or Internet Protocol (IP) address assignment for the subscribers.

In Metro Ethernet and DSLAM aggregation deployments, the scalability of VLANs and network services is a need that continues to grow among service providers (SPs) worldwide. One difficulty is how to scale point-to-point Ethernet Virtual Connections (EVCs) in Metro Ethernet networks. Currently service providers who need to offer broadband service to their subscribers can choose between two different primary architectures: IEEE 802.1Q ("QinQ") tunneling architecture and MPLS network architecture with Ethernet over MPLS (EoMPLS) extended at the edge of the SP network.

In QinQ tunneling, the SP assigns a provider-VLAN tag for each service instance. This tag is used in the provider Ethernet switches to identify the customer's VLAN (CVLAN) across the core SP network. While QinQ allows an increase in the number of customers by carrying multiple customers' VLANs in a single SP VLAN, the services which can be offered are inherently limited by the available VLANs in the SP's Layer 2 domain. In other words, the proposed IEEE 802.1Q specification is limited by the fact that the 12-bit VLAN ID can only support a combined total of up to 4,094 broadcast domains and service instance domains. The 4K VLAN ID space thus restricts the number of VLANs or VPNs that can be handled, and is often inadequate for operations over a SP Metro network. One proposed solution to the scalability problem imposed by the 4K VLAN ID space limitation is described in U.S. Patent Application Publication 2004/0165600.

The main drawback of the MPLS network architectural approach with Ethernet over MPLS (EoMPLS) extended at the edge of the SP network is that it is much more expensive as compared to the QinQ approach. In addition, MPLS networks are generally not optimized for multipoint connection. This is due to various reasons, such as a lack of local switching (VLAN bridging) within the access network, traffic replication, and bandwidth consumption at the edge of the core. A pure MPLS architecture also does not allow VLAN bridging, which might be a requirement for certain SPs to interconnect end-users in the same Metro area.

Another possible architectural solution is the proposed IEEE 802.1ad standard, which defines a tunneling mechanism to scale the number of MAC addresses in a Layer 2 network. Basically, this approach improves the service scalability problem by introducing a 20-bit service instance identifier, thereby overcoming the 4,094 VLAN ID limitation discussed above. However, the problem with this approach is that the IEEE 802.1ad standard does not provide traffic engineering capability for point-to-point EVCs.

What is needed therefore is an apparatus and method that overcomes the aforementioned problems inherent in the prior art, and which is capable of offering a wide variety of services (e.g., voice, video, and data with L2 and L3 VPN capability) on a single physical interface.

BRIEF DESCRIPTION OF THE DRAWINGS

The present invention will be understood more fully from the detailed description that follows and from the accompanying drawings, which, however, should not be taken to limit the invention to the specific embodiments shown, but are for explanation and understanding only.

FIG. 4 is a command listing for configuring a network device in accordance with one embodiment of the present invention.

DETAILED DESCRIPTION

A hybrid port of a network device that enables a diverse set of L2 and L3 services on a single physical interface is described. The single physical interface may comprise a User-to-Network Interface (UNI), a Network-to-Network Interface (NNI), or other interfaces that provide similar or extended functionality. In the following description specific details are set forth, such as device types, protocols, operating systems, interfaces, network configurations, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes (i.e., devices), such as intermediate nodes and end nodes. A local area network (LAN) is an example of such a subnetwork; a plurality of LANs may be further interconnected by an intermediate network node, such as a router, bridge, or switch, to extend the effective "size" of the computer network and increase the number of communicating nodes. (A router is basically a computer or node dedicated to routing packets.) Examples of the end nodes may include servers and personal computers. The nodes typically communicate by exchanging discrete frames or packets of data according to predefined protocols. In this context, a protocol consists of a set of rules defining how the nodes interact with each other.

Figure 1:
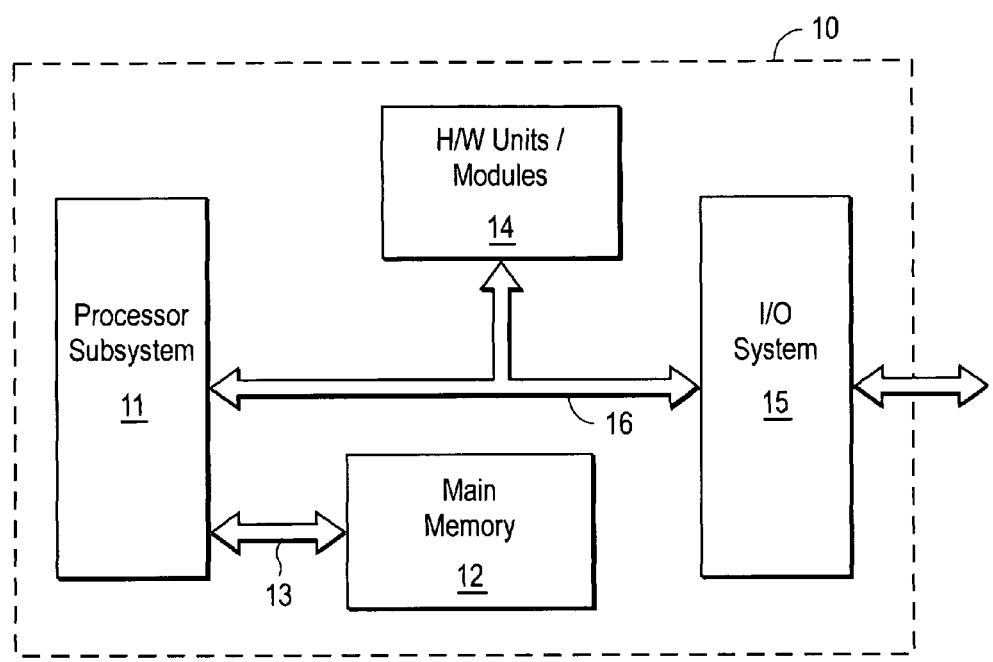
FIG. 1 is a generalized circuit schematic block diagram of a network node.

As shown in FIG. 1, each node 10 typically comprises a number of basic subsystems including a processor subsystem 11, a main memory 12 and an input/output (I/O) subsystem 15. Data is transferred between main memory ("system memory") 12 and processor subsystem 11 over a memory bus 13, and between the processor and I/O subsystems over a system bus 16. Examples of the system bus may include the conventional lightning data transport (or hyper transport) bus and the conventional peripheral component (computer) interconnect (PCI) bus. Node 10 may also comprise other hardware units/modules 14 coupled to system bus 16 for performing additional functions. Processor subsystem 11 may comprise one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

According to one embodiment of the present invention, a single hybrid physical interface (i.e., either a UNI or NNI port) is provided that is able to offer voice, video, and data at the same time with L2 or L3 VPN capability. The services offered can be retail services, such as Internet access to the residential and business customers, video on demand, voice over IP, television broadcast, or wholesale services that can be resold to other ISPs and content providers. For instance, a single UNI port in accordance with the present invention is capable of delivering point-to-point (P2P), point-to-multipoint (P2MP), and multipoint services to customers connecting to a service provider network. The hybrid port of the present invention thus combines the benefits of a VLAN-based approach and of MPLS architecture. P2P services may be enabled through EoMPLS Martini tunnels, while P2MP and multipoint conductivity is achieved through VLAN bridging. In an exemplary embodiment, a VLAN for P2P EVCs represents a service instance identifier, whereas in a P2MP or multipoint EVC it acts as a broadcast domain. Therefore, in one embodiment, P2P EVCs are configured under a sub-interface, thus avoiding the MAC learning requirements and usage of MAC table resources. Multipoint connections may be enabled using a Switch Virtual Interface (SVI) or a L2 Virtual Forwarding Instance (VFI).

Practitioners in the art will appreciate that a hybrid UNI (or NNI) in accordance with the present invention is not exclusive; that is, it can coexist with QinQ and 802.1ad enabled architectures in the same network. Furthermore, the approach of the present invention is compatible with Metro redundancy mechanisms such as Gigabit Ethernet and traditional hub-and-spoke network services, e.g., Frame Relay (FR) and asynchronous transfer mode (ATM).

Figure 2:
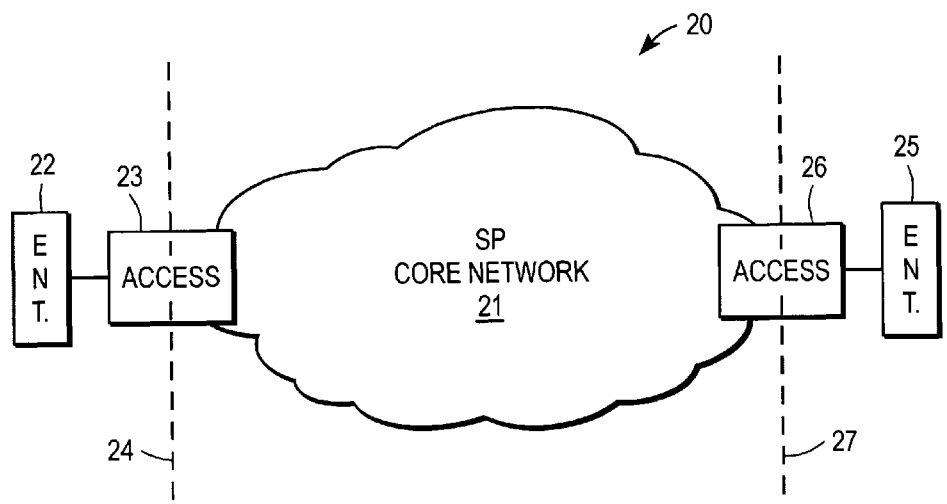
FIG. 2 illustrates an exemplary end-to-end network diagram in accordance with one embodiment of the present invention.

FIG. 2 illustrates an exemplary network 20 in accordance with one embodiment of the present invention, which includes an SP core network 21 connected with access networks 23 and 26 providing service connectivity to enterprises 22 and 25, respectively. Dashed lines 24 and 27 denote the interface between the enterprise network and the service provider network. In accordance with one embodiment of the present invention, the connections across core network 21 may be Ethernet VLAN-based (802.1Q, 802.1D, 802.1ad, etc.) MPLS-based (EoMPLS or VPLS) with Martini tunnels (i.e., pseudowires), point-to-point, or multipoint.

Figure 3:
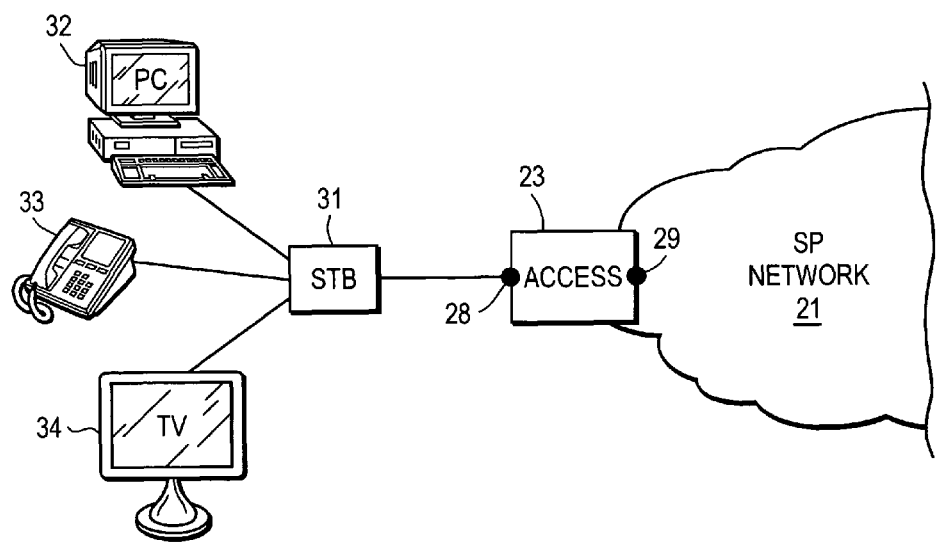
FIG. 3 illustrates an exemplary portion of a network showing various customer services being provided in accordance with one embodiment of the present invention.

FIG. 3 is a specific example illustrating the various services that may be offered using a hybrid port that provides L2 and L3 services simultaneously in accordance with one embodiment of the present invention. The hybrid port is shown in FIG. 3 as comprising a UNI 28 (copper or fiber) that functions as a single physical interface connects user with service provider network 21. In the illustration of FIG. 3, the user has a set-top box (STB) 31 that connects with SP network 21 via UNI 28, and which is also connects with a variety of user devices, including a personal computer (PC) 32, a VoIP telephone 33, and a television 34, that may be configured for on-demand access or broadcast services. In another implementation, STB 31 may be replaced with a DSLAM device As previously discussed, the hybrid port of the present invention may also be implemented as a NNI 29, which may provide a connection between two switches or two networks. For example, NNI 29 may comprise a switchport that carries all of the L2 traffic as well as the L3 service traffic (e.g., MPLS, VPN, etc.)

FIG. 4 is a command listing for configuring a single interface or port of a network device to provide L2 and L3 services at the same time in accordance with one embodiment of the present invention. Practitioners in the art will appreciate that the example of FIG. 4 includes commands specific to a Cisco® switch or router; however, corresponding commands for configuring other types of switches and routers may also be utilized in accordance with the present invention. On Cisco switches, individual interface naming follows a convention wherein the first number refers to a slot on the router or switch, and the second number refers to the specific interface or port. Thus, the command line "interface 1/1" refers to an interface configuration of the second port of the first slot. (Note that port numbering starts at 0, not at 1.)

Configuration of the Layer 2 services on port 1/1 comprises three commands, which are shown in the listing of FIG. 4. The "switchport" command is used to modify the switching characteristics of the L2-switched interface. In other words, this is the keyword identifying a L2 port. This is followed by the "switchport mode trunk" command, which is a command used to set the interface type; in this case, to specify a trunking VLAN L2 interface. In trunk mode, the interface negotiates to convert the link into a trunk link even if the neighboring interface does not agree to change. The last command in the L2 portion of the listing is the "switchport trunk vlan 10-100" command, which is used to set the trunk characteristics when the interface is in trunking mode. In this example, all VLANs that fall within the number range 10-100 will be switched on this physical port at the L2 level. (It is appreciated that VLANs are assigned numbers for identification within and between switches. Cisco switches have two ranges of usable VLAN numbers: the normal range (1-1000) and the extended range (1025-4096)).

The L3 portion of the exemplary command listing shown in FIG. 4 begins with the identification of a sub-interface using the command "interface 1/1.300". It should be understood that in the Cisco interface operating system (IOS) an Ethernet sub-interface is a logical interface. After identification of the sub-interface, the "xconnect" command is utilized to configure the interface for L2 VPN services on VLAN 0.300. The "xconnect" configuration command, by way of example, permits the VLAN sub-interface to route L2 packets over a specified point-to-point VC by using EoMPLS. An EoMPLS VC may run across an MPLS SP cloud to connect interfaces on two provider edge customer-located equipment (PE-CLE) devices at each edge of the SP network. Note that the syntax of the xconnect command (an exemplary pseudocode command is shown in FIG. 4) normally includes a destination IP address of the remote provider edge device, and a virtual connection identifier for the virtual connection between the peer provider edge devices. An MPLS data encapsulation method may also be specified.

The final command in the configuration sequence for Layer 3 services is the "interface 1/1.400" command, which specifies MPLS VPN services on VLAN 0.400 of the port.

It should be understood that the present invention is not limited to the use of any specific L3 service. In other words, a variety of different L3 services, such as VRF, IP, xconnect, etc., may be specified on the sub-interface while still providing L2 switching on the main interface. It should be further understood that the present invention may be implemented in via a firmware/software upgrade on the customer (or access network) equipment that reconfigures resources at the physical port using existing hardware/equipment.

In addition, no new protocols are required to implement the various embodiments of the present invention. The hybrid interface of the present invention supports standard protocols and is compatible with service protocols that include Ethernet Relay Service (ERS), Ethernet Wire Service (EWS), Ethernet Multipoint Service (EMS), Ethernet Relay Multipoint Service (ERMS), and Ethernet Private Line (EPL) service.

It should be understood that elements of the present invention may also be provided as a computer program product which may include a "machine-readable medium" having stored thereon instructions which may be used to program a computer (e.g., a processor or other electronic device) to perform a sequence of operations. A machine-readable medium" may include any computer program product, apparatus and/or device (e.g., magnetic discs, optical disks, memory, Programmable Logic Devices (PLDs) used to provide machine instructions and/or data to a programmable processor, including a machine-readable medium that receives machine instructions as a machine-readable signal. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions. Elements of the present invention may be downloaded as a computer program product, wherein the program may be transferred from a remote computer or telephonic device to a requesting computer by way of data signals embodied in a carrier wave or other propagation medium via a communication link (e.g., a modem or network connection).

Although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

We claim:

1. A method of configuring a single physical interface of a switch or router, comprising:
   issuing a first set of commands that enables switching of Layer 2 (L2) services falling within a specified range on a main interface of the single physical interface, the first set of commands including:
      a first command that identifies the main interface as a L2 port;
      a second command that specifies an interface type of the L2 port;
      a third command that sets trunk characteristics when the L2 port is in a trunking mode; and
   issuing a second set of commands that enables switching of Layer 3 (L3) services on a sub-interface of the main interface, wherein the L2 and L3 services are provided simultaneously on the single physical interface.

2. The method of claim 1 wherein the single physical interface comprises a User-to-Network Interface (UNI).

3. The method of claim 1 wherein the single physical interface comprises a Network-to-Network Interface (NNI).

4. The method of claim 1 wherein the L2 and L3 services include point-to-point (P2P), point-to-multipoint (P2MP), and multipoint services.

5. The method of claim 4 wherein the L2 and L3 services are enabled through Ethernet over Multi-protocol Label Switching (EoMPLS) tunnels extending across a service provider network.

6. A method of operation for a switch or router, comprising:
   carrying a first type of data traffic over a main interface of the single physical interface of the switch or router, the first type of data traffic including Layer 2 (L2) services, the main interface being configured as a L2 port; and
   simultaneously carrying a second type of data traffic over a sub-interface of the main interface, the second type of data traffic including Layer 3 (L3) services, the L2 and L3 services including point-to-point (P2P). point-to-multipoint (P2MP). and multipoint services; and
   providing the P2MP and multipoint services through Virtual Local Area Network (WAN) bridging. wherein a VLAN for P2P Ethernet Virtual Connections EVCs represents a service instance identifier whereas a VLAN for the P2MP services acts as a broadcast domain.

7. The method of claim 6 wherein the single physical interface comprises a User-to-Network Interface (UNI).

8. The method of claim 6 wherein the single physical interface comprises a Network-to-Network Interface (NNI).

9. A User-to-Network Interface (UNI) of a switch or router comprising:
   a main physical interface configured to carry a first type of data traffic, the first type of data traffic including Layer 2 services; and
   a sub-interface of the main physical interface, the sub-interface being configured to configured to simultaneously carry a second type of data traffic that includes Layer 3 services, the Layer 3 services including the point-to-point (P2P), point-to-multipoint (P2MP), and multipoint services, the P2MP and multipoint services being provided through Virtual Local Area Network (VLAN) bridging, a VLAN for P2P Ethernet Virtual Connections (EVCs) representing a service instance identifier, whereas a VLAN for the P2MP services acts as a broadcast domain.

10. A Network-to-Network Interface (NNI) of a switch or router comprising:
    a main physical interface configured to carry a first type of data traffic, the first type of data traffic including Layer 2 services; and
    a sub-interface of the main physical interface, the sub-interface being configured to configured to simultaneously carry a second type of data traffic that includes Layer 3 services, the Layer 3 services including the point-to-point (P2P), point-to-multipoint (P2MP), and multipoint services, the P2MP and multipoint services being provided through Virtual Local Area Network (VLAN) bridging, a VLAN for P2P Ethernet Virtual Connections (EVCs) representing a service instance identifier, whereas a VLAN for the P2MP services acts as a broadcast domain.

* * * * *